Figure 1:
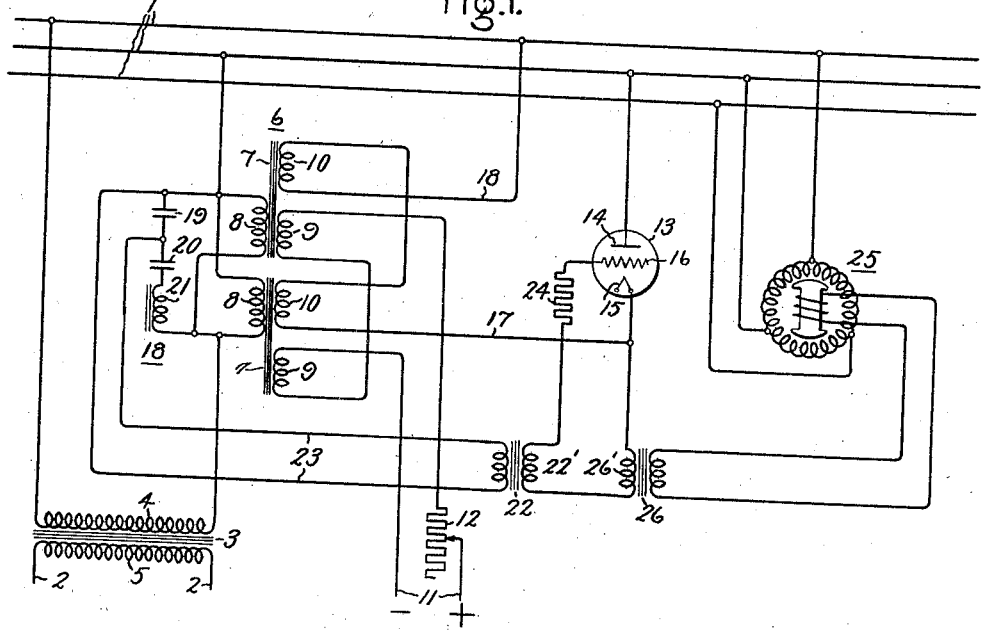

June 22, 1937.  M. A. EDWARDS  2,084,899
SYSTEM OF ELECTRICAL DISTRIBUTION
Original Filed Oct. 10, 1935    2 Sheets-Sheet 1

Inventor:
Martin A. Edwards,
by Harry E. Dunham
His Attorney.

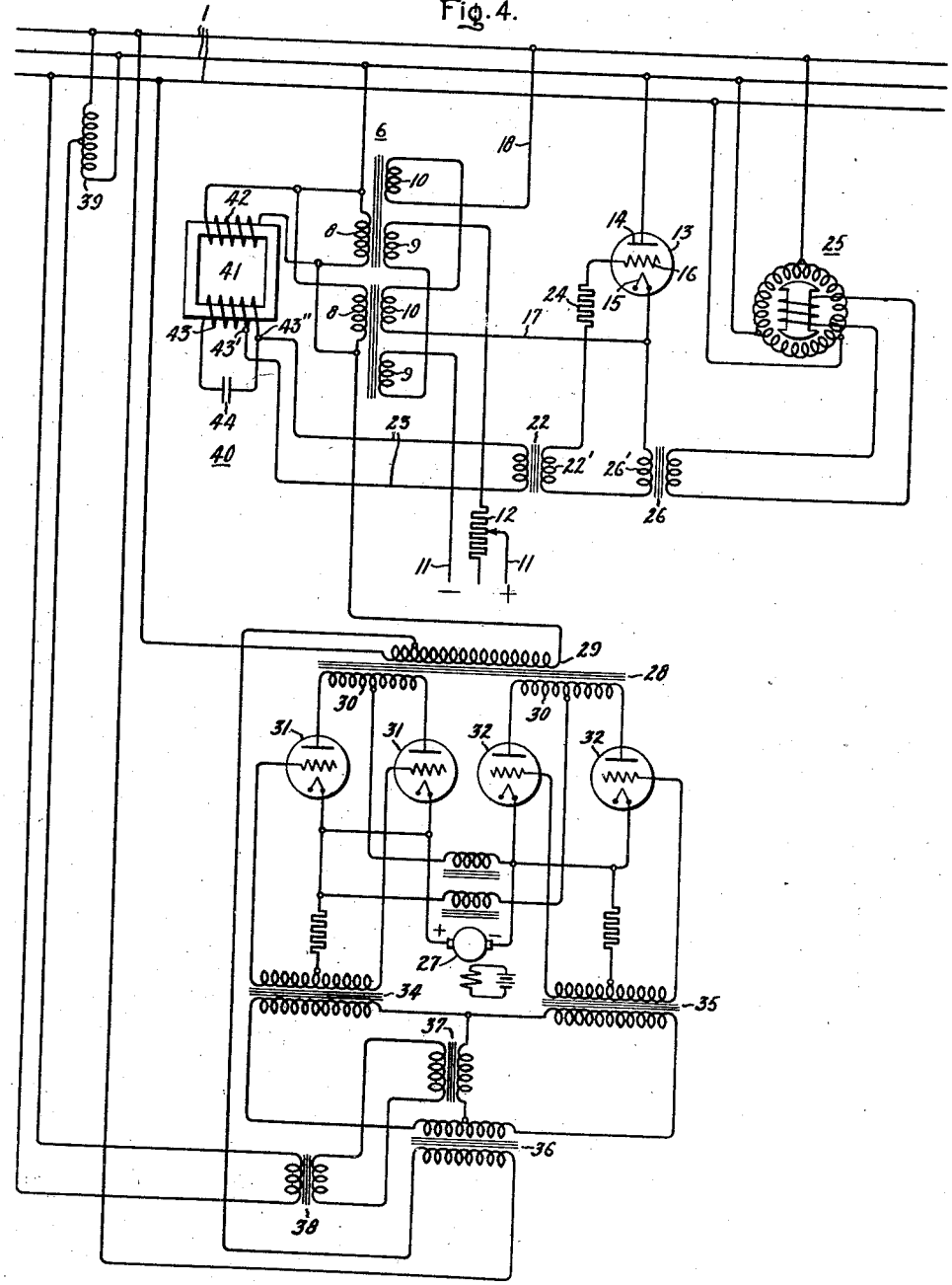

Patented June 22, 1937

2,084,899

UNITED STATES PATENT OFFICE 2,084,899

SYSTEM OF ELECTRICAL DISTRIBUTION

Martin A. Edwards, Schenectady, N. Y., assignor to General Electric Company, a corporation of New York Application October 10, 1935, Serial No. 44,451
Renewed February 4, 1937

18 Claims. (Cl. 171—119)

My invention relates to systems of electrical distribution and more particularly to control or regulating systems which automatically control operating characteristics of such systems.

Heretofore in electrical distribution systems there have been devised various arrangements for controlling operating characteristics of an associated load circuit. In many of these arrangements means have been devised to furnish a substantially constant voltage to a load circuit over a predetermined range of power transfer and which are designed to provide an inherent current limiting characteristic in the event of severe overload. In these systems, the desired current limiting feature has been obtained at the sacrifice of the maximum power obtainable with the apparatus used in a particular application. Particularly is this true in the case of electric valve rectifying apparatus, such, for example, as mercury arc rectifying installations where energy is being transmitted from an alternating current supply circuit to a regenerative direct current load circuit. In applications of this nature, it is desirable, of course, to obtain satisfactory voltage regulation and to obtain an arrangement which will limit the current upon regeneration to a value within the current rating of the particular apparatus employed. By way of example, such a system having an inherent current limiting characteristic has been obtained in the prior art arrangements by the use of apparatus having a relatively high inductive reactance to limit the current. Arrangements of this nature, of course, obtain this current limiting feature by the sacrifice of the maximum power obtainable.

It is an object of my invention to provide an improved electrical distribution system.

It is another object of my invention to provide an improved control system for electrical distribution systems.

It is a further object of my invention to provide an improved electrical distribution system which makes it possible to control an operating condition within a predetermined range of power transfer in either direction and to effect a predetermined departure from said operating condition for values of power transfer in excess of the range.

It is a still further object of my invention to provide an improved system of electrical distribution suitable for transmitting energy in either direction between alternating current circuits or between an alternating current circuit and a direct current circuit in which an electrical characteristic of the system may be maintained substantially constant for loads less than a predetermined value and in which the electrical characteristic may be varied in a predetermined manner in response to an increase in load above the predetermined value.

In accordance with the illustrated embodiments of my invention, a load circuit is energized from a supply circuit by means of an associated inductive winding and through a variable impedance device which is utilized to control electrical characteristics such as the voltage or current of the load circuit. The variable impedance device may be a saturable reactor having a winding interposed between the supply circuit and the load circuit. Variation in the impedance of this load circuit is obtained by controlling the magnetizing winding is obtained by controlling the magnetization of the saturable reactor. The saturable reactor is also provided with two unidirectional magnetizing windings, one of which impresses upon the magnetic circuit of the reactor a substantially constant magneto-motive force and the other winding, which may be termed a control winding, is utilized to control the magnetization of the saturable reactor. To obtain means automatically responsive to the power transfer between the circuits, I provide an arrangement including an electric valve and an associated control circuit responsive to the power transfer between the circuits, or which may be as hereinafter described, responsive to the voltage across the variable impedance winding to control the conductivity of the electric valve and hence the energization of the control winding. Although not restricted thereto, my invention may be employed to provide a controlling or regulating system which maintains the voltage within predetermined limits for values of power transfer within a predetermined range and which maintains constant current for values of power transfer in excess of said range. My invention is readily applicable to regenerative systems and will function to maintain the above-described relations for energy transfer in either direction.

For a better understanding of my invention, together with other and further objects thereof, reference may be had to the following description taken in connection with the accompanying drawings, and its scope will be pointed out in the appended claims.

Figure 2:
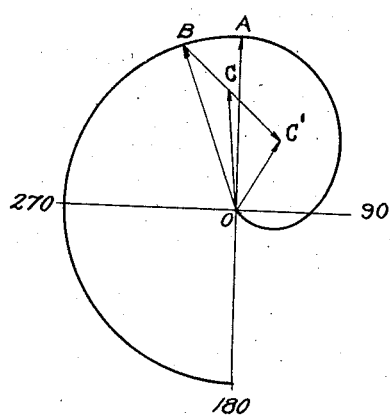
Figure 3:
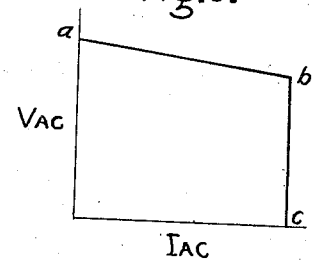

In the drawings, Fig. 1 illustrates diagrammatically an embodiment of my invention as applied to an arrangement for transmitting energy between a three phase alternating current supply circuit and a single phase alternating current load circuit; Fig. 2 is a vector diagram to aid in the understanding of my invention; Fig. 3 represents certain operating characteristics of this embodiment of my invention, while Fig. 4 represents a modified embodiment of my invention as applied to a system employing electric valves for transmitting energy between a three phase alternating current supply circuit and a direct current regenerative load circuit.

Referring now to Fig. 1 of the drawings, there is illustrated diagrammatically an electrical distribution system embodying my invention. By way of example, I have shown a three phase alternating current circuit 1 for supplying energy to a single phase alternating current load circuit 2 by means of a transformer 3 having a primary winding 4 and a secondary winding 5. Interposed between the supply circuit 1 and the load circuit 2 and connected in series with the primary winding 4 of transformer 3, I provide a variable impedance device such as a saturable reactor 6 having core members 7, variable impedance windings 8, unidirectional magnetizing windings 9 and magnetization control windings 10. While I have shown the variable impedance windings 8 connected in parallel, it will be understood that these windings may be connected in series. The unidirectional magnetizing windings 9 are energized from a suitable source of direct current 11 through an adjustable resistance 12. The magnetization control windings 10, which establish a unidirectional magnetomotive force to assist that established by the unidirectional magnetizing windings 9, are energized from the alternating current supply circuit 1 through an electric valve 13, of the vapor electric discharge type, having an anode 14, a cathode 15, and a control member 16. During the interval of operation when the electric valve 13 is conductive, current will flow from the alternating current circuit 1 through electric valve 13, conductor 17, windings 10, conductor 18, and return to alternating current circuit 1.

In order to control the impedance of the variable impedance windings 8 and hence to control the voltage of the load circuit 2 in response to the power transfer, I provide an arrangement for controlling the energization of the control windings 10 by means of electric valve 13 in response to the power transfer between supply circuit 1 and load circuit 2. This arrangement as shown comprises a tuned filter circuit 18 having a capacitance 19, a capacitance 20 and an inductance 21 forming a series circuit and connected in parallel with the variable impedance windings 8. The filter circuit 18 serves the purpose of supplying a substantially sine wave alternating potential to the transformer 22. Because of the saturation of the reactor 6 and the irregular wave shape of the current which flows through windings 8 if electric valves are employed in the circuit 2, the voltage appearing across windings 8 is very irregular in wave shape. By means of the tuned filter I obtain a voltage of suitable wave form to provide satisfactory control of the electric valve 13 in response to variations of power transfer between supply circuit 1 and load circuit 2. The voltage appearing across the capacitance 19 is substantially fixed in phase relative to the voltage across windings 8 and has an effective value proportional to the voltage across the windings 8. The voltage appearing across capacitance 19 is impressed upon the primary winding of transformer 22 having a secondary winding 22', through conductors 23, to control the magnitude and phase of the resultant voltage impressed upon the control member 16 of electric valve 13. A suitable resistance 24 is connected in series with the control member 16 to limit the current which flows through the control member. Any suitable phase shifting arrangement 25 is employed to impress upon the control member 16 through a transformer 26 having a secondary winding 26', and the transformer 22, an auxiliary potential substantially constant in phase and magnitude. The phase shifting arrangement 25 may be adjusted manually to control the value of power transfer at which electric valve 13 is rendered non-conductive. The resultant voltage which is impressed upon the control member 16 of electric valve 13, therefore, will be the vectorial sum of the voltages appearing across secondary winding 26' of transformer 26 and secondary winding 22' of transformer 22. The circuit through which the current for the control member flows is, cathode 15, secondary winding 26' of transformer 26, secondary winding 22' of transformer 22, resistance 24, control member 16 and returning to cathode 15.

Although I have shown an embodiment of my invention as applied to a system for transmitting power between a three phase alternating current circuit and a single phase load circuit, it will be apparent that my invention in its broader aspects may be applied to electrical distribution systems generally, including systems for transmitting energy between alternating current circuits and between alternating current circuits and direct current circuits.

It will be understood that my invention may be applied to electrical distribution systems, in which it is desirable to obtain a rapid increase in voltage when the power transfer exceeds a certain value. One way in which such a requirement could be satisfied would be to energize windings 10 to establish a magnetomotive force in opposition to that established by windings 9 so that within the normal range of power transfer, the reactor 6 is unsaturated and the impedance of windings 8 is relatively large. Upon overload, the windings 10 will be de-energized to permit the windings 9 to effect substantial saturation and a decided decrease in the impedance of the windings 8.

The operation of the embodiment of my invention diagrammatically shown in Fig. 1 may be best explained by referring to Fig. 2 which represents the polar diagram of the average power or average conductivity of a valve of the vapor electric discharge type with respect to the phase displacement between the anode and control member voltages. In this polar diagram, which represents the average conductivity of the vapor electric valve 13, the vector OA represents the anode-cathode voltage; the vector OB represents the auxiliary voltage appearing across secondary winding 26' of transformer 26; the vectors BC and BC' represent the voltages appearing across the secondary winding 22' of transformer 22 under different operating conditions and the magnitude of each is respectively proportional to the voltage appearing across the variable impedance windings 8 for the particular condition; and the vectors OC and OC' are the resultant voltages impressed upon the control member 16 of electric valve 13 for the respective conditions. It will be understood by those skilled in the art that the average conductivity of an electric valve of this type will remain substantially constant for angular displacements between the anode and control member voltages within the 180 to 360 electrical degrees lagging range or, in other words, for phase displacement between these two voltages within the two leading quadrants. It is further understood that as the voltage of the control member begins to lag the anode voltage, the average conductivity of the valve will decrease. Therefore, if means are provided to vary the magnitude and angular displacement of the voltage impressed upon the control member relative to the anode voltage, the conductivity of the valve may be gradually decreased and the valve subsequently may be rendered entirely non-conductive by causing the control voltage to lag the anode voltage and by reducing the resultant control voltage to a value less than the critical control voltage for that particular type of valve.

Referring more particularly to the polar diagram illustrated in Fig. 2, the heavy curve represents the average conductivity of a valve of the vapor electric discharge type, and the vector OB represents the voltage appearing across the secondary winding 26' of transformer 26. The phase of this voltage, as stated above, may be varied relative to the anode-cathode voltage of valve 13 by means of the phase shifting arrangement 25. And, of course, the magnitude of this voltage may be adjusted by choosing a transformer of desirable voltage ratio. The voltage appearing across secondary winding 22' of transformer 22 for different conditions of operation may be represented by vectors BC and BC' in the polar diagram of Fig. 2. The phase of the voltage appearing across the secondary winding 22' may be varied relative to the anode voltage by choosing suitable values for the capacitances 19 and 20 and inductance 21 of the filter circuit 18. The voltages appearing across the winding 22' during the operation of the system remain substantially fixed in phase but, of course, these voltages vary in magnitude in accordance with the voltage appearing across the variable impedance winding 8 which in turn is a function of the power transfer between the supply circuit 1 and load circuit 2. For values of power transfer within the predetermined range, it is possible to obtain by the proper design of the excitation circuit for valve 13, an arrangement which maintains the resultant voltage impressed upon the control member 16 in a leading phase relation to the anode voltage, such as that represented by the vector OC. It will be understood that the magnitude of the resultant grid voltage will be greater than the critical control potential for the valve so that the valve is fully conductive. And by means of the voltage appearing across capacitance 19 and hence by means of the voltage appearing across secondary winding 22', which vary in response to the power transfer, the resultant voltage impressed upon the control member 16 is rotated from a leading position represented by the vector OC to a lagging position represented by the vector OC'. Upon further increase in power transfer, the resultant control member voltage will be caused to lag by a greater angle and the magnitude of this voltage will be further decreased. When the control member voltage is reduced below the critical voltage for the valve, the valve will be rendered non-conductive.

Under normal operating conditions, that is when the value of power supplied to the load circuit 2 from the alternating current circuit 1 is within the normal or nominal rating of the apparatus employed, the saturable reactor 6 will be energized to a relatively high degree of magnetization. Under these conditions, the reactor 6 will be substantially saturated, reducing the impedance of the variable impedance winding to a relatively small value. The saturation described is, of course, obtained by means of the undirectional magnetomotive force impressed upon the magnetic circuit of reactor 6 by means of windings 9 and the control windings 10. So long as the power transfer between the circuits remains within the normal range for the particular apparatus, electric valve 13 will be maintained conductive so that it supplies current to the control windings 10 to impress a unidirectional magnetomotive force of substantially constant value upon the magnetic circuit to assist the magnetomotive force established by windings 9. If it be assumed that the value of power transfer exceeds a predetermined maximum value, as explained above, the voltage appearing across the secondary winding 22' of transformer 22 will have increased to such a value to have caused the voltage impressed upon the control member 16 to lag the anode voltage. During this interval in which this control voltage lags the anode voltage and is greater than the critical voltage for the particular valve, the average conductivity of the valve 13 and hence the current which it supplies to the control windings 10 will decrease according to the relation shown in the polar diagram of Fig. 2. When the resultant voltage of control member 16 is reduced to a value below the critical voltage for the particular valve employed, the valve will be rendered entirely non-conductive to effect complete de-energization of control windings 10. The effect of this decrease in energization of the control windings 10 and the subsequent complete de-energization of these windings, of course, will be to obtain a gradual decrease in the saturation of the reactor 6 and a subsequent rapid decrease in the saturation of the reactor. In accordance therewith, the impedance of the variable impedance windings 8 will be gradually increased and subsequently rapidly increased in accordance with the above described operation.

When the system is transferring energy between the alternating current circuit 1 and the load circuit 2 at a rate which is within the normal rating of the apparatus involved, it will be understood that the impedance of the variable impedance windings 8 is relatively small and that the voltage regulation of the apparatus will be satisfactory, inasmuch as the voltage drop incident to the flow of current through the variable impedance windings 8 will be negligible.

When the load circuit 2 is regenerating, the system will perform in a similar manner, that is, within a predetermined range of power transfer the impedance of windings 8 will be relatively small permitting the circuit 2 to furnish energy at a certain rate. However, if the power transfer exceeds the maximum value, valve 13 will be rendered non-conductive and the impedance of windings 5 will increase to limit the current to the maximum value. During the regeneration period, the excitation circuit 18 will perform in the manner explained above to provide control of the electric valve 13.

Referring to Fig. 3, the curve $ab$ represents the voltage characteristic of the apparatus during operation within the predetermined range of power transfer. When the supply circuit 1 is supplying energy to the load circuit 2, the curve *abc* represents the voltage-current relationship at the primary winding 4 or the secondary winding 5 of transformer 3. When the system is regenerating, the curve *abc* represents the voltage-current relationship of the system at the supply circuit 1. When the power transfer exceeds a predetermined maximum value, causing the impedance of the variable impedance winding 8 to increase to a very substantial value, it will be understood that there will be a rapid decrease in voltage for values of power transfer exceeding the maximum value, which condition is represented by curve *bc* of Fig. 3. In other words, the system described will operate to maintain a substantially constant voltage over a certain range of power transfer and will operate to maintain a constant current within the system for power transfer in excess of the range.

Referring now to Fig. 4 of the drawings, there is shown diagrammatically a modification of my invention as applied to a translating circuit employing electric valves for transmitting the electrical energy between an alternating current circuit and a direct current regenerative load circuit. The modified embodiment of my invention represented in Fig. 4, differs from that shown in Fig. 1, by employing a modified control circuit for the variable impedance means and by showing a conventional type direct current regenerative load circuit and associated control means for the electric valves employed in the translating circuit. Corresponding elements in Fig. 4 have been given like reference numerals.

In the translating apparatus illustrated in Fig. 4, energy is transmitted between an alternating current supply circuit 1 and a direct current machine 27, through a transformer 28 having a primary winding 29 and secondary windings 30, and through a variable impedance means such as the saturable reactor 6. Electric valves 31 and 32, preferably of the vapor electric type, are connected to the secondary windings 30. To control the conductivity of electric valves 31 and 32, I employ an excitation circuit similar to that shown in Patent No. 1,985,981, issued January 1, 1935 on my application and assigned to the assignee of the present application.

The electric valves 31 are excited for converter operation and the electric valves 32 are excited for inverter operation by means of the excitation circuit described hereinafter. The control members of electric valves 31 are energized by transformer 34 and the control members of electric valve 32 are energized by the transformer 35. To obtain a suitable bias voltage, I employ a transformer 36 having a secondary winding connected in series with the primary windings of transformers 34 and 35. This initial phase bias may be any desired amount but is preferably substantially 90 degrees lagging relative to the anode voltages. The average value of the current supplied to the direct current machine 27 by the electric valve apparatus may be varied, as desired, by varying the phase relationship between the grid and anode voltages. For example, when the grid and anode voltages are substantially in phase with each other the current flowing in the output circuit is maximum and when the grid and anode voltages are substantially 180 degrees out of phase with each other, the current is minimum or zero, while for intermediate phase relationships between the anode and control member voltages the current has corresponding intermediate values. In order to vary the phase relationship between the grid and anode voltages, a component voltage is supplied to the grid circuit by means of transformer 37 having one terminal connected to the mid-point of the secondary winding of transformer 36 and the other terminal connected between the secondary windings of transformers 34 and 35. Transformer 37 is energized through a transformer 38 and an autotransformer 39 to obtain a component voltage having a phase displacement of approximately 45 degrees leading relative to the voltage appearing across the secondary winding of transformer 36. By means of this component voltage introduced into the control circuit, I obtain an automatic variation in the excitation of the electric valves 31 and 32 so that when direct current machine 27 tends to regenerate energy may be transmitted from the direct current machine 27 to the supply circuit 1.

I provide a tuned filter circuit, such as the excitation circuit 40, which is a modification of the excitation circuit 18 described above in connection with Fig. 1. As explained above, the periodic voltage appearing across the variable impedance windings 8 is of irregular wave shape. To obtain a voltage for controlling electric valve 13, in a more refined manner than with the arrangement shown in Fig. 1, I employ the modified circuit 40, which comprises a transformer 41 having a primary winding 42 connected across the windings 8 and having a secondary winding 43. Connected across the secondary winding 43, there is a capacitance 44 which with the inductance of the transformer 41, forms a tuned oscillatory circuit preferably having a natural resonance frequency equal to the frequency of the alternating current source 1. Any suitable fraction, or portion of the voltage appearing across winding 43 is utilized by means of taps 43' and 43'' to energize the transformer 22. The voltage appearing across the secondary winding 43 will be of a substantially sine wave shape. The transformer 41 is designed so that the voltage appearing across winding 43 varies directly in response to the voltage across windings 8, thereby providing a quantity which varies in accordance with the power transfer between the circuits and which may be used to control the impedance of windings 8 and the maximum power transmitted.

The operation of the modified embodiment of my invention shown in Fig. 4 is substantially the same as that described above in connection with Fig. 1. When energy is being transmitted from alternating current source 1 to the direct current machine 27, the voltage impressed upon the rectifying valves 31 will remain substantially constant over the normal range of power transfer, and for values of power transfer in excess of the predetermined range there will be a rapid decrease in voltage. In other words, the system will tend to maintain a constant current on overload. If the direct current machine 27 begins to regenerate, the counter-electromotive force of the direct current machine 27 will function to cause electric valves 32 to operate as an inverter effecting transmission of energy from the machine 27 to the supply circuit 1. During the first part of the regeneration period in systems of this nature, the current through the system and the electric valves 32 tends to increase to a relatively large value. It is, therefore, of decided importance to prevent the current from rising to an excessively large value. The saturable reactor 6, the electric valve 13 and the excitation circuit 40 will operate automatically in the manner described in connection with Fig. 1 to increase the impedance of windings 8 to maintain the current within safe limits. It will be understood that the voltage-current relation shown in Fig. 3 may be obtained for power transfer in either direction between the circuits. My invention may also be used as a starting and control circuit for dynamoelectric machines.

While I have shown and described my invention as applied to a particular system and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, variable impedance means including a saturable reactor for controlling an electrical characteristic of said load circuit for values of power transfer within a predetermined range and for effecting a predetermined departure from said characteristic for values of power transfer in excess of said range, and means comprising an electric valve responsive to an electrical condition of said variable impedance means for maintaining the impedance of said variable impedance means substantially constant within said predetermined range of power transfer and for varying the impedance of said variable impedance means in a predetermined manner for values of power transfer in excess of said range.

2. Apparatus for transmitting energy between a supply circuit and a load circuit comprising a variable impedance means including a saturable reactor for controlling a predetermined electrical characteristic of said load circuit for values of power transfer within a predetermined range in either direction between said supply circuit and said load circuit and for effecting a predetermined departure from said electrical characteristic for values of power transfer in excess of said range, and electric valve means for controlling the magnetization of said reactor.

3. In combination, a supply circuit, a load circuit, means for controlling an electrical characteristic of said load circuit within a predetermined range of power transfer between said circuits and for effecting a predetermined departure from said characteristic for values of power transfer in excess of said range comprising a variable impedance winding interposed between said circuits, and means responsive to an electrical condition of said winding for controlling said first-mentioned means.

4. Apparatus for transmitting energy between an alternating current supply circuit and a regenerative direct current load circuit comprising an inductive network having a primary winding connected to be energized from said supply circuit through a variable impedance winding and having a secondary winding connected to said load circuit through electric valve apparatus, and means comprising a control electric valve for controlling the impedance of said variable impedance winding for energy transfer in either direction between said circuits to effect control of the voltage impressed upon said electric valve apparatus.

5. Apparatus for transmitting energy between a supply circuit and a regenerative load circuit comprising an inductive network having a primary winding connected to be energized from said supply circuit through a variable impedance means and having a secondary winding connected to said load circuit, said variable impedance means comprising a saturable reactor for controlling the voltage of said primary winding within a predetermined range of power transfer between said circuits and for maintaining constant current in said primary winding for values of power transfer exceeding said range.

6. In combination, a supply circuit, a load circuit, variable impedance means for controlling an electrical characteristic of said load circuit within a predetermined range of power transfer between said circuits and for effecting a predetermined departure from said characteristic for values of power transfer in excess of said range comprising a saturable reactor including a winding for controlling the potential of said load circuit, a unidirectional magnetizing winding for impressing a substantially constant magnetomotive force on the magnetic circuit of said reactor, a control winding for impressing an additional unidirectional magnetomotive force on said magnetic circuit, and means responsive to the voltage across said first-mentioned winding for controlling the energization of said control winding.

7. In combination, a supply circuit, a load circuit, variable impedance means for controlling an electrical characteristic of said load circuit within a predetermined range of power transfer between said circuits and for effecting a predetermined departure from said characteristic for values of power in excess of said range comprising a saturable reactor including a winding for controlling the potential of said circuit, a unidirectional magnetizing winding for impressing a substantially constant magnetomotive force on the magnetic circuit of said reactor, a control winding for impressing an additional unidirectional magnetomotive force on said magnetic circuit, and means comprising an electric valve for effecting energization of said control winding for values of power transfer within said predetermined range and for effecting de-energization of said control winding for values of power transfer exceeding said range.

8. In combination, a supply circuit, a load circuit, variable impedance means for controlling the voltage of said load circuit within a predetermined range of power transfer between said circuits and for maintaining constant current in said load circuit for values of power transfer in excess of said range comprising a saturable reactor including a winding for controlling the potential of said load circuit, means responsive to the voltage across said winding for controlling the saturation of said reactor including an electric valve having a control member, and means responsive to said voltage across said winding for impressing upon said control member a potential for controlling the conductivity of said valve to effect substantial saturation of said reactor within said range of power transfer and for effecting rapid de-saturation of said reactor for values of power transfer exceeding said range.

9. In combination, a supply circuit, a load circuit, variable impedance means for controlling the voltage of said load circuit within a predetermined range of power transfer between said circuits and for maintaining constant current in said load circuit for values of power transfer in excess of said range comprising a saturable reactor including a winding for controlling the potential of said load circuit, a unidirectional magnetizing winding for impressing a substantially constant magnetomotive force on the magnetic circuit of said reactor, a control winding for impressing an additional unidirectional magnetomotive force on said magnetic circuit, and means responsive to the voltage across said first-mentioned winding for controlling the energization of said control winding comprising an electric valve having a control member and an excitation circuit therefor responsive to said voltage across said first-mentioned winding for impressing upon said control member a potential for controlling the conductivity of said valve to effect substantially constant energization of said control winding within said range of power transfer and for effecting rapid de-energization of said control winding for values of power transfer exceeding said range.

10. In combination, an alternating current circuit, an impedance device connected in said circuit, means for controlling the impedance of said impedance device comprising an electric valve, a tuned filter circuit connected to be energized in accordance with an electrical characteristic of said impedance device, and means for controlling said valve in accordance with an electrical characteristic of said filter circuit.

11. In combination, a supply circuit, a load circuit, and an electric translating circuit for transmitting energy between said circuits comprising a variable impedance device for controlling an electrical characteristic of said load circuit and means responsive to an electrical condition of said variable impedance device for controlling said device including an electric valve and an excitation circuit therefor having a tuned filter circuit.

12. In combination, a supply circuit, a load circuit, a variable impedance device interposed between said circuits for controlling an electrical characteristic of said load circuit, and means for controlling the impedance of said device comprising an electric valve and an excitation circuit therefor responsive to an electrical condition of said variable impedance device including a filter circuit to obtain a potential from said impedance device of substantially sine wave form to control the conductivity of said valve.

13. In combination, a supply circuit, a load circuit, a saturable reactor interposed between said supply circuit and said load circuit having a variable impedance winding to control the voltage of said load circuit, and means responsive to the voltage across said winding for controlling the impedance of said winding comprising an electric valve having a control member and an excitation circuit therefor including a transformer having a primary winding connected across said variable impedance winding and a secondary winding connected to a tuned filter circuit, said control member being energized from said tuned filter circuit.

14. In combination, a supply circuit, a load circuit, a variable impedance device interposed between said circuits for controlling an electrical characteristic of said load circuit, and means responsive to an electrical condition of said variable impedance device for controlling the impedance of said device, said means comprising an electric valve having a control member and an excitation circuit for controlling the conductivity of said valve in response to said characteristic including a source of periodic potential of irregular wave form having an effective value proportional to said electrical characteristic, a tuned filter circuit for obtaining a potential of substantially sine wave form fixed in phase relative to said periodic potential and having an effective value proportional to said periodic potential and an auxiliary source of alternating potential of constant effective value and being fixed in phase relative to said sine wave potential for impressing upon said control member a potential equal to the sum of said sine wave potential and said auxiliary potential.

15. In an excitation circuit for an electric valve having a control member comprising a source of potential, a tuned filter circuit for impressing on said control member a potential of substantially sine wave form and having a frequency equal to the natural resonance frequency of said filter circuit.

16. In an excitation circuit for an electric valve having a control member comprising a source of periodic potential, a transformer having a primary winding connected to said source and a secondary winding connected to a tuned oscillatory circuit of a predetermined natural resonance frequency for supplying a sine wave potential having an effective value proportional to said periodic potential, an auxiliary source of alternating potential having a frequency equal to the frequency of said sine wave potential, and means for impressing upon said control member a resultant potential equal to the sum of said sine wave potential and said auxiliary potential to control the conductivity of said valve in response to said periodic potential.

17. In an excitation circuit for an electric valve having a control member comprising a source of periodic potential of irregular wave form and variable effective value, a tuned circuit for obtaining a potential of substantially sine wave form of variable effective value and fixed in phase relative to said source of periodic potential and having a frequency equal thereto, an auxiliary source of alternating potential of constant effective value and having a frequency equal to that of said alternating potential, and means for effecting an addition of the auxiliary potential and the sine wave potential to impress upon said control member a resultant potential variable in phase and magnitude to control the conductivity of said valve in response to the magnitude of said periodic potential.

18. In an excitation circuit for an electric valve having a control member comprising a transformer having a primary winding energized from a source of periodic potential of irregular wave form and having a secondary winding connected to a tuned oscillatory circuit having a natural resonance frequency equal to the frequency of said periodic potential for supplying a substantially sine wave potential having an effective value proportional to said periodic potential and fixed in phase relative to said periodic potential, an auxiliary source of alternating potential having a frequency equal to the frequency of said sine wave potential and fixed in phase relative thereto, and means for effecting an addition of said sine wave potential and said auxiliary potential to impress upon said control member a resultant potential variable in phase and magnitude to control the conductivity of said valve in response to said periodic potential.

MARTIN A. EDWARDS.